US009060327B2

(12) United States Patent
Seo et al.

(10) Patent No.: US 9,060,327 B2
(45) Date of Patent: Jun. 16, 2015

(54) METHOD OF TRANSMITTING DATA

(75) Inventors: Han Byul Seo, Anyang-si (KR); Byoung Hoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 1001 days.

(21) Appl. No.: 13/128,698

(22) PCT Filed: Nov. 9, 2009

(86) PCT No.: PCT/KR2009/006553
§ 371 (c)(1),
(2), (4) Date: May 11, 2011

(87) PCT Pub. No.: WO2010/056019
PCT Pub. Date: May 20, 2010

(65) Prior Publication Data
US 2011/0235570 A1    Sep. 29, 2011

Related U.S. Application Data

(60) Provisional application No. 61/113,600, filed on Nov. 12, 2008.

(30) Foreign Application Priority Data

Dec. 30, 2008    (KR) .................. 10-2008-0136248

(51) Int. Cl.
*H04B 7/14*    (2006.01)
*H04W 40/08*   (2009.01)
*H04L 12/733*  (2013.01)
*H04B 7/26*    (2006.01)
(Continued)

(52) U.S. Cl.
CPC ............. *H04W 40/08* (2013.01); *H04B 7/2606* (2013.01); *H04L 45/122* (2013.01); *H04W 36/30* (2013.01); *H04W 84/047* (2013.01); *Y02B 60/50* (2013.01)

(58) Field of Classification Search
CPC .... H04L 45/122; H04W 40/08; H04B 7/2606
USPC ........................................... 370/315
See application file for complete search history.

(56) References Cited

U.S. PATENT DOCUMENTS 5,355,514 A * 10/1994 Borg .............................. 455/423
5,887,245 A *  3/1999 Lindroth et al. ............... 455/69
6,018,661 A *  1/2000 Raith et al. .................... 455/437
(Continued)

FOREIGN PATENT DOCUMENTS

EP       1 450 179 A1      8/2004
KR   10-2008-0020241 A    3/2008
KR   10-2008-0086072 A    9/2008

*Primary Examiner* — Asad Nawaz
*Assistant Examiner* — Syed S Ali
(74) *Attorney, Agent, or Firm* — Birch, Stewart, Kolasch & Birch, LLP

(57) ABSTRACT

A data transmission method is provided. The method includes: receiving from a plurality of receiving stations, which include base stations and relay stations, a state information value corresponding to the receiving stations; measuring signal strength with respect to the receiving stations; selecting any one receiving station from among the receiving stations which have a great signal strength value obtained by measuring the signal strength and which have a small state information value; and transmitting data to the selected receiving station. Accordingly, radio resources can be prevented from ineffective use caused by relay transmission.

12 Claims, 3 Drawing Sheets

(51) Int. Cl.
    *H04W 36/30*    (2009.01)
    *H04W 84/04*    (2009.01)

(56) References Cited

U.S. PATENT DOCUMENTS

| | | | |
|---|---|---|---|
| 7,373,152 B2* | 5/2008 | Oesterling | 455/456.1 |
| 7,627,329 B2* | 12/2009 | Mizugaki et al. | 455/456.1 |
| 8,134,945 B2* | 3/2012 | Kim et al. | 370/315 |
| 8,149,760 B2* | 4/2012 | So et al. | 370/315 |
| 8,275,391 B2* | 9/2012 | Krannich et al. | 455/456.1 |
| 8,831,626 B2* | 9/2014 | Hyun et al. | 455/456.1 |
| 2001/0029321 A1 | 10/2001 | Beetz et al. | |
| 2003/0033394 A1* | 2/2003 | Stine | 709/222 |
| 2004/0162085 A1 | 8/2004 | Han | |
| 2005/0227703 A1* | 10/2005 | Cheng | 455/456.1 |
| 2006/0252367 A1 | 11/2006 | Haartsen | |
| 2007/0135059 A1 | 6/2007 | Yomo et al. | |
| 2007/0140123 A1* | 6/2007 | Fukui | 370/235 |
| 2007/0280172 A1* | 12/2007 | Tan et al. | 370/335 |
| 2008/0056174 A1 | 3/2008 | Jung et al. | |
| 2008/0075007 A1* | 3/2008 | Mehta et al. | 370/238 |
| 2008/0117857 A1* | 5/2008 | Myojo | 370/315 |
| 2008/0232296 A1 | 9/2008 | Shin et al. | |
| 2009/0316629 A1* | 12/2009 | Singh et al. | 370/328 |
| 2010/0246417 A1* | 9/2010 | Cheng et al. | 370/252 |
| 2013/0163505 A1* | 6/2013 | Lysejko et al. | 370/315 |

* cited by examiner

METHOD OF TRANSMITTING DATA

CROSS REFERENCE TO RELATED APPLICATIONS

This application is the National Phase of PCT/KR2009/006553 filed on Nov. 9, 2009, which claims priority under 35 U.S.C. 119(e) to U.S. Provisional Application No. 61/113,600 filed on Nov. 12, 2008, and Korean Patent Application No. 10-2008-0136248 filed on Dec. 30, 2008.

TECHNICAL FIELD

The present invention relates to wireless communications, and more particularly, to a method of transmitting data by selecting a base station or a relay station.

BACKGROUND ART

3rd generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future. Reduction of cost per bit, increase of service availability, flexible use of frequency bands, simple structure and open interface, proper power consumption of a user equipment, and the like are defined as requirements.

To overcome a restriction on a service area and a limitation in a user capacity, the wireless communication system provides a communication service by dividing the service area into a plurality of cells. This is referred to as a multi-cell environment. A cell is a region in which a base station (BS) provides a communication service. One BS can provide a service to at least one cell. A user equipment (UE) belongs to one cell. A cell to which the UE belongs is referred to as a serving cell. Another cell adjacent to the serving cell is referred to as a neighbor cell.

The wireless communication system differs from a wired communication system in that a seamless service has to be transmitted to UEs having mobility. That is, when a UE moves its location from a serving cell to a neighbor cell, the neighbor cell to which the UE moves has to be switched to the serving cell in order to provide the seamless service to the UE.

As such, a process of switching the serving cell of the UE due to movement of the UE is referred to as handover. In this case, a cell to which the UE originally belongs is referred to as a source cell, and a new cell to which the UE moves is referred to as a target cell. A BS providing a communication service to the source cell is referred to as a source BS. A BS providing a communication service to the target cell is referred to as a target BS. In the handover process, the UE is disconnected from the source BS and is then newly connected to the target BS.

Since the wireless communication system is a time-variant system, a radio condition may change over time. In addition, when the UE moves, a radio condition between the serving BS and the UE and a radio condition between the target BS and the UE may rapidly deteriorate. In addition, when a relay station is employed between the BS and the UE, a channel state between the relay station and the BS may also deteriorate. Therefore, those variables have to be considered as much as possible to ensure quality of service and to effectively use radio resources when a cell is selected or when data is transmitted and received after the cell selection.

In addition, the present invention prevents waste of radio resource or transmission delay by selecting a relay station on the basis of only signal strength.

In addition, the present invention intends to increase efficiency of radio resource usage by selecting a suitable relay station (or base station) by considering its state that varies on a real-time basis.

DISCLOSURE OF INVENTION

Technical Problem

The present invention provides a technique capable of selecting a suitable method on the basis of a channel state or a state of a base station and a relay station when data is transmitted.

Solution to Problem

According to an aspect of the present invention, data transmission method is provided. The method includes: receiving from a plurality of receiving stations, which include base stations and relay stations, a state information value corresponding to the receiving stations; measuring signal strength with respect to the receiving stations; selecting any one receiving station from among the receiving stations which have a great signal strength value obtained by measuring the signal strength and which have a small state information value; and transmitting data to the selected receiving station.

Advantageous Effects of Invention

According to an embodiment of the present invention, a suitable data transmission method can be determined based on a channel state or a state of a base station and a relay station.

In addition, according to an embodiment of the present invention, a state of a relay station is considered in various aspects so as to prevent transmission delay or radio resource waste caused by wrong selection of the relay station.

In addition, according to an embodiment of the present invention, a suitable relay station (or base station) is selected by considering its state that varies on a real-time basis, thereby increasing efficiency of radio resource usage.

MODE FOR THE INVENTION

Figure 1:
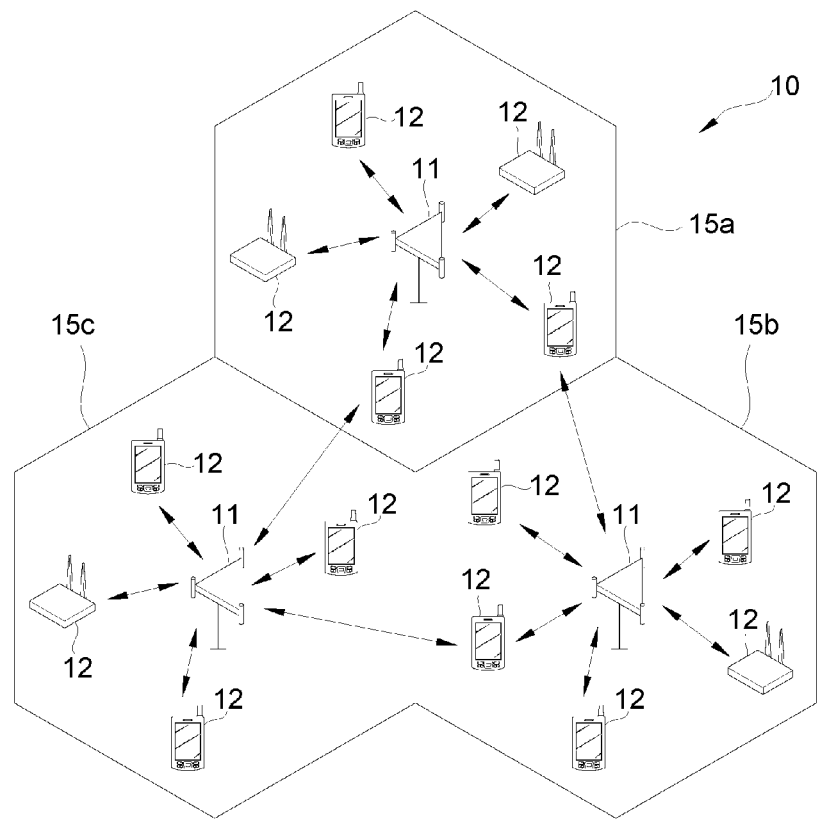
FIG. 1 shows a wireless communication system in a multi-cell environment.

FIG. 1 shows a wireless communication system in a multi-cell environment.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors).

A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink implies communication from the BS 11 to the UE 12, and an uplink implies communication from the MS 12 to the BS 11. In the downlink, a transmitter may be a part of the BS 11, and a receiver may be a part of the UE 12. In the uplink, the transmitter may be a part of the UE 12, and the receiver may be a part of the BS 11.

The UE 12 may perform communication by selecting one cell from among a plurality of cells, which is called cell selection or cell reselection. That is, a cell selection process is a process of selecting a cell by the UE 12 to receive a service. In general, the UE 12 selects a cell having a strongest signal property value by measuring a signal with respect to the BS 11 in all searchable frequency bands.

A cell for providing a service to the UE 12 is referred to as a serving cell. When the UE 12 moves its location to a place far from the serving cell or when a radio condition with the serving cell deteriorates, a suitable cell capable of receiving a signal with better quality is reselected. This is called a cell reselection process.

The cell reselection process is a process of selecting a more suitable cell on the basis of signal measurement in an idle state and a cell reselection criterion. The UE 12 requests a service to a network, or waits in the idle state to receive the service from the network. The UE 12 in the idle state repeats a process of reselecting a cell having a better signal property by measuring signals of a serving cell and a neighbor cell.

In a case where the cell reselection process is performed only by signal measurement of the UE 12, a system load such as a camp load or a traffic load may be generated when a large number of UEs 12 are located in one cell, and thus the BS 11 cannot properly distribute the system load. A method capable of effectively performing the cell reselection process of the UE 12 is required to provide better quality of service to the UE 12 having mobility.

Figure 2:
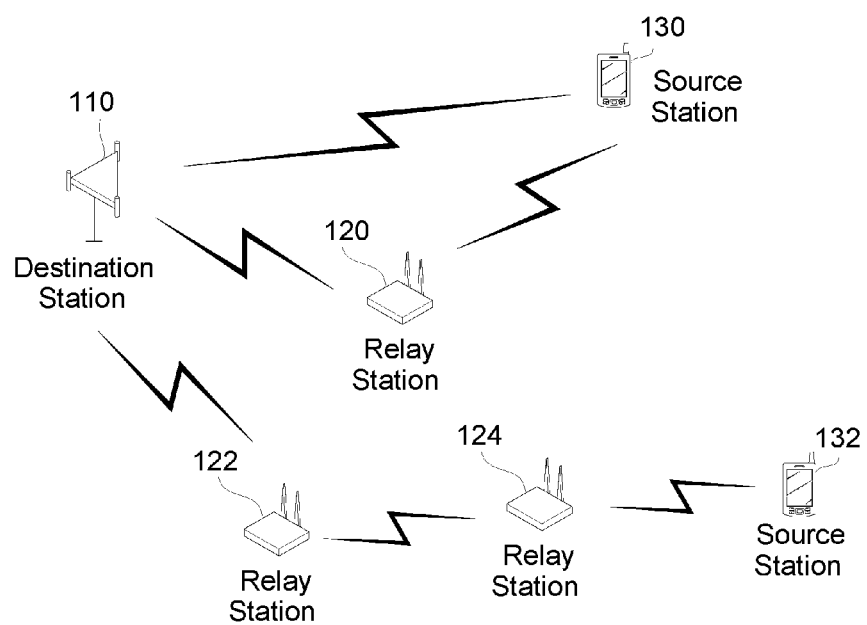
FIG. 2 shows a wireless communication system employing a relay station.

FIG. 2 shows a wireless communication system employing a relay station.

For clarity of explanation, it is shown in FIG. 2 that the wireless communication system includes one destination station 110, three relay stations 120, 122, and 124, and two source stations 130 and 132. However, the wireless communication system may include any numbers of destination stations, relay stations, and source stations. In uplink transmission, the source station may be a UE, and the destination stations may be a BS. In downlink transmission, the source stations may be a BS, and the destination stations may be a UE. The relay station may be a UE, or may be provided as a separate relay station. The BS may perform functions such as connectivity, management, control, and resource allocation between the relay station and the UE.

Referring to FIG. 2, the destination station 110 communicates with the source station 130 via the relay station 120. In uplink transmission, the sources station 130 transmits signals to the destination station 110 and the relay station 120, and the relay station 120 retransmits the received signals.

The destination station 110 communicates with the source station 132 via the relay stations 122 and 124. In uplink transmission, the source station 132 transmits signals to the destination station 110 and the relay stations 122 and 124. The relay stations 122 and 124 concurrently or sequentially retransmit the received signals.

A relay scheme used in the relay stations may be either amplify and forward (AF) or decode and forward (DF), and the technical features of the present invention are not limited thereto.

It is assumed hereinafter that the source station 132 is a UE and the destination station 110 is a BS, and the UE transmits uplink data to the BS. According to another embodiment of the present invention, the source station 132 may be a BS and the destination station 110 may be a UE, and the UE may receive downlink data.

When the UE (i.e., the source station 130) is located in the coverage of the BS (i.e., the destination station 110), the UE can be connected to the BS through a direct link. However, if a distance between the UE and the BS is far or if signal loss is severe due to buildings or the like, communication with the BS may be achieved by using the relay stations 122 and 124 within a cell so that communication is performed in a better channel state.

When the UE has a poor channel state with respect to the BS since the UE is located outside the coverage of the BS, the UE is connected to the BS through a relay link of the relay stations 122 and 124. In this case, the relay stations receive a downlink signal transmitted from the BS and relay the received downlink signal to the UE. Further, the relay stations receive an uplink signal transmitted from the UE and relay the uplink signal to the BS.

However, when a channel state of a link connected between the source stations 130 and 132 and the relay stations 120, 122, and 124 is good while a channel state of a link connected between the relay stations 120, 122, and 124 and the destination station 110 is not good, an undesired situation may occur in which the relay stations 120, 122, 124 are used even if it is desired that the source stations 130 and 132 are connected directly to the destination station 110.

Figure 3:
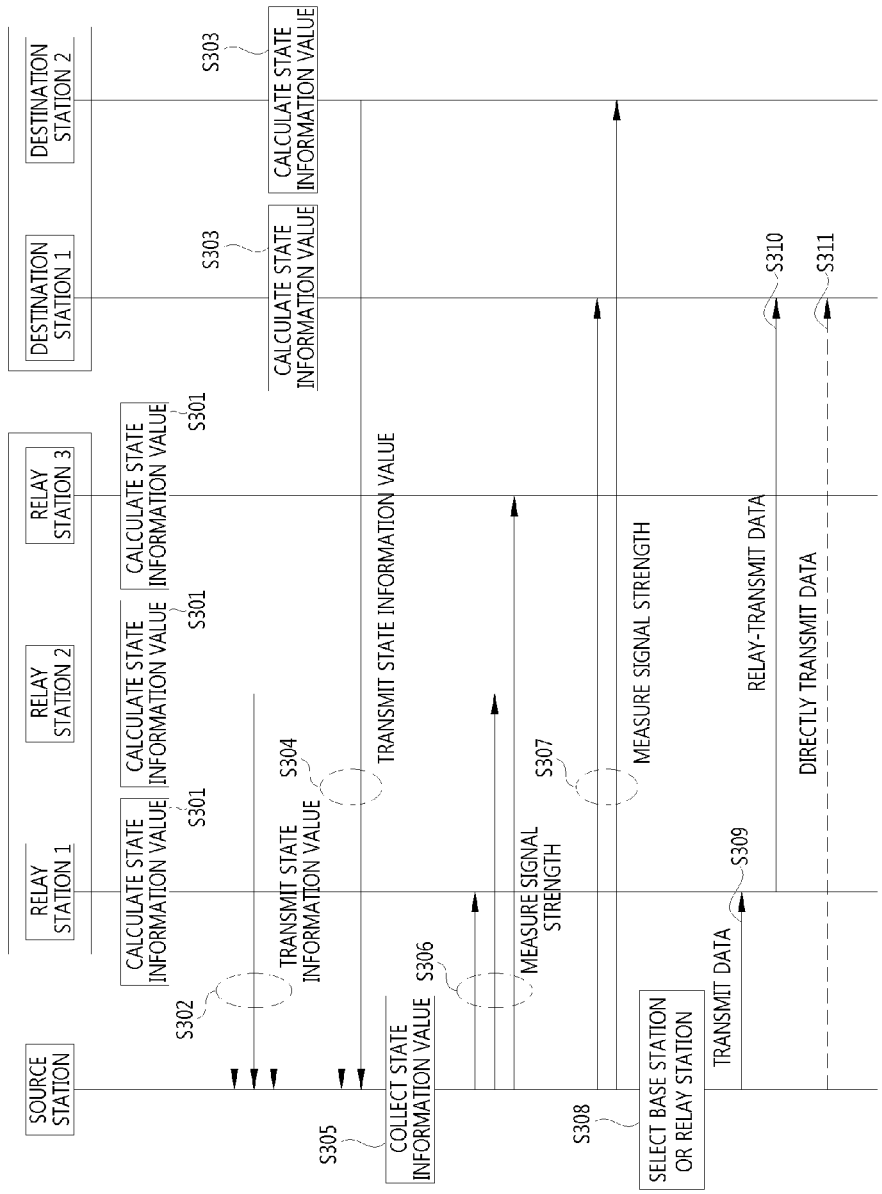
FIG. 3 is a flowchart showing a method of selecting a relay station or a destination station by a source station according to an embodiment of the present invention.

FIG. 3 is a flowchart showing a method of selecting a relay station or a destination station by a source station according to an embodiment of the present invention.

The source station may be a UE or a BS. A process of selecting the BS (i.e., destination station) by the UE (i.e., source station) may correspond to a cell selection process or a cell reselection process. Therefore, data transmission of the source station is uplink data transmission. In an opposite case, that is, in a case where the source station is the BS and the destination station is the UE, data transmission may be downlink data transmission.

The source station receives a state information value from relay stations 1, 2, and 3 and destination stations 1 and 2 (steps S302 and S304). The state information value is calculated by each relay station and each destination station. Hereinafter, an entity which includes a relay station and a destination station and which receives data from a source station is referred to as a receiving station only when distinction between the relay station and the destination station is not necessary.

Before the source station receives the state information value from receiving stations, the receiving stations calculate the state information value (step S301 and S303). The state information value may be calculated directly before the state information value is transmitted to the source station. Alternatively, the state information value may be a value unique to each receiving station. Calculation of the state information value for each receiving station or transmission of the state information value does not have to be achieved simultaneously, and an order thereof also does not have to be determined. In order for all source stations participating in the cell selection or reselection process to receive the state information value, each receiving station may transmit the state information value by carrying the state information value on a broadcast channel or a system information message.

The state information value is a value considered in the selection of the relay station or the destination station. By using the state information value in the selection of the relay station or the destination station, it is possible to select a more suitable data transmission method, in particular, according to a state of the relay station.

The state information value is a "value for quantizing inefficiency of possible resource utilization, which may occur when transmission is currently performed via a corresponding relay station" and may be expressed with several bits. The state information value proposed in the present invention may be set by considering various factors to be described below.

In this case, a relay station or a BS of which the state information value is small is considered as a suitable relay station or a suitable BS to which a UE is preferably connected. On the contrary, when "efficiency of resource utilization" is defined as a quantized value, it may be more preferable to have a great state information value. The former case is assumed in the present invention to describe the state information value according to the embodiment of the present invention. However, it is apparent that the scope of the present invention is not limited thereto.

The state information value may be determined by using a channel state. In the conventional cell selection, relay station selection or determination on whether to use a relay station is performed by considering only signal strength or a channel state from the UE to the relay station. When a specific relay station is selected, whether the number of hops accumulated during data is delivered to a destination station from the relay station is great, whether a channel state from the relay station to the destination station is good, whether an offered load of the relay station is great, or the like are not considered.

In the embodiment of the present invention, a channel state between the relay station and the destination station or between the UE and the destination station, the number of hops, an offered load of each receiving station, or the like may be considered in the state information value. In particular, as to the state information value of the relay station, a channel state between the relay station and the destination station may be considered.

A case of determining a state information value by using a channel state will be described. First, when setting a state information value of a relay station, as described above, the state information value is determined by measuring a channel state of up to a destination station. For example, if a channel state from the relay station to the destination station is good, the state information value may be set to a small value. Otherwise, if the channel state is poor, the state information value is set to a great value. In this case, the smaller the state information value, the higher the probability of being selected by a source station.

In a case where a BS is directly connected to a wired network, the BS can be considered as a relay station of which a channel state of a link between the BS and the relay station is infinitely good, and thus a corresponding state information value can be set to a minimum value. Such a state information value is referred to as a minimum state information value.

For example, the BS directly connected to the wired network may set its state information value to 0. A relay station of which an average signal to interference plus noise ratio (SINR) with the BS is 20 dB or higher may set its state information value to 1. A relay station of which an average SINR with the BS is less than 20 dB may set its state information value to 2.

Alternatively, the state information value may be determined by considering the number of hops, that is, the number of relay stations via which data has to be relayed.

When a receiving station determines its state information value, the receiving station may consider the number of hops according to the number of relay stations via which data transmitted from a source station has to be relayed until the data is delivered to a destination station connected to the wired network. The greater the number of hops via which data is transmitted, the higher the probability that resource utilization is ineffective. Therefore, a relay station having a large number of hops up to the wired network sets its state information value to a great value. In this case, if the receiving station is not the relay station but the destination station, in particular, the BS directly connected to the wired network, the receiving station may set its state information value to a minimum state information value.

In addition thereto, the receiving station may consider its offered load in the determining of the state information value. If the offered load of each destination station (or relay station) is heavy, a corresponding state information value is set to be a great value. For example, the offered load is a value indicating the number of UEs connected to the receiving station, or an amount of radio resources used at each time instance, or an amount of data stored in a current buffer and waiting for transmission. The offered load may represent an offered load of each receiving station.

If the receiving station which determines the state information value by using the offered load is a relay station, the relay station may determine the state information value by considering not only an offered load caused by UEs connected to the relay station but also an offered load of a destination station to which data from the relay station is relayed. That is, if the offered load of the destination station is heavy, the state information value of the relay station for relaying data to the destination station is set to a great value.

The state information value depending on the offered load for each receiving station may be regulated by compensating for the state information value determined based on a channel state and/or the number of hops. That is, when the relay station sets its state information value on the basis of the channel state with the BS and the number of hops, if the state information value has a great deviation, a significantly large or small number of UEs may attempt to establish a connection. As a result, an offered load between receiving stations becomes imbalanced or inefficiency thereof increases. Therefore, each receiving station may first determine its state information value on the basis of the channel state or the number of hops and thereafter compensate for the state information value on the basis of an offered load that varies on a real-time basis. In doing so, the number of source stations connected to each receiving station can be regulated to a desired number.

The state information value calculated by each receiving station is collected by the source station (step S305). The source station receives the state information value corresponding to each receiving station. The state information value may be temporarily stored in the source station.

The source station measures signal strength of each receiving station to calculate a signal strength value for each receiving station. If the receiving station is a BS, this process may correspond to cell measurement (steps S306 and S307). Measurement on the signal strength for each receiving station does not have to be concurrently performed, and an order of the receiving stations is not defined. In addition, unless the signal strength is regulated according to the state information value or factors of determining the state information value, signal strength measurement may be performed prior to calculation of the state information value.

The source station selects a receiving station by using the state information value and the signal strength value (step S308). That is, by selecting the receiving station, if data is transmitted by using a relay transmission mechanism, the source station can determine via which relay station the data is transmitted or determine to which BS the data is transmitted. Alternatively, whether the data is transmitted via the relay station or directly to the BS can be determined by selecting the receiving station.

The source station may select a receiving station having best signal strength among receiving stations of which the state information value is within a specific range, or on the contrary, may select a receiving station of which the state information value satisfies a specific condition among receiving stations having good signal strength.

As another example of cell selection performed by the UE, the UE sorts receiving stations in an ascending order of their state information values or selects receiving stations of which the state information value is within a specific range. Then, a receiving station having the greatest signal strength value may be selected among several receiving stations having small state information values. In this case, after relay stations and destination stations are separately sorted, the relay station and the destination station may be selected one by one, or any one of the selected relay station and the selected destination station may be compared to finalize the receiving station selection.

Alternatively, the source station searches for a BS and/or a relay station having a minimum state information value on the basis of the received state information values. The minimum state information value has been described above. If there is no relay station or BS having the minimum state information value, the receiving stations are sorted in an ascending order of their state information values.

If two or more BSs and/or relay stations have the minimum state information value, or if the selected BS and/or the selected relay station have a relatively small state information value, the source station may select a relay station or a BS having the greatest signal strength value. However, if there is no receiving station of which the state information value is within a specific range, a process of selecting a cell having the greatest signal strength value is repeated after changing the range of a state information value. Through this process, the source station selects a relay station or a BS for receiving data.

According to another embodiment, to select the receiving station, the source station may calculate a suitability of each receiving station by using information such as the state information value and the signal strength value. When the relay station and/or the destination station are selected by calculating the suitability, the state information value and the signal strength value can be considered together.

The suitability may be calculated according to an equation which returns a great value when the signal strength is great and the state information value is small. In this case, the state information value is set to a great value as to a receiving station which is not suitable to be selected by the source station due to several reasons, for example, i) a poor channel state, ii) a large number of hops, and iii) a heavy offered load. On the contrary, the state information value is set to a small value as to a receiving station in a suitable environment in which the receiving station is suitably selected by the source station.

The source station may use a corresponding state information value received from each receiving station as an offset value. For example, if $P_i$ denotes signal strength measured after being received from an $i^{th}$ BS (or relay station) and $v_i$ denotes a state information value of the $i^{th}$ BS (or relay station), the source station may calculate a suitability S according to Equation 1 below.

$$S = P_i - c^* v_i \qquad \text{[Equation 1]}$$

Then, the source station attempts to accesses to the relay station or the BS having the maximum suitability. Herein, c denotes a coefficient for converting the state information value to a value that can be compared with receive power strength. In the conventional cell selection or relay station selection method, a BS and/or a relay station having the maximum $P_i$ are selected without consideration of the value $v_i$ in Equation 1 above.

When the relay station and/or the destination station are selected according to the aforementioned process, the source station (i.e., UE) can increase efficiency of resource utilization in the selecting of the BS and/or the relay station to which the source station intends to be connected.

If the relay station 1 is selected according to the process of selecting the receiving station, the source station transmits data to the relay station 1 (step S309). Thereafter, the relay station 1 relays the data to the destination station 1 (step S310). If the destination 1 is selected according to the process of selecting the receiving station, the source station directly transmits data to the destination station 1 (step S311).

Figure 4:
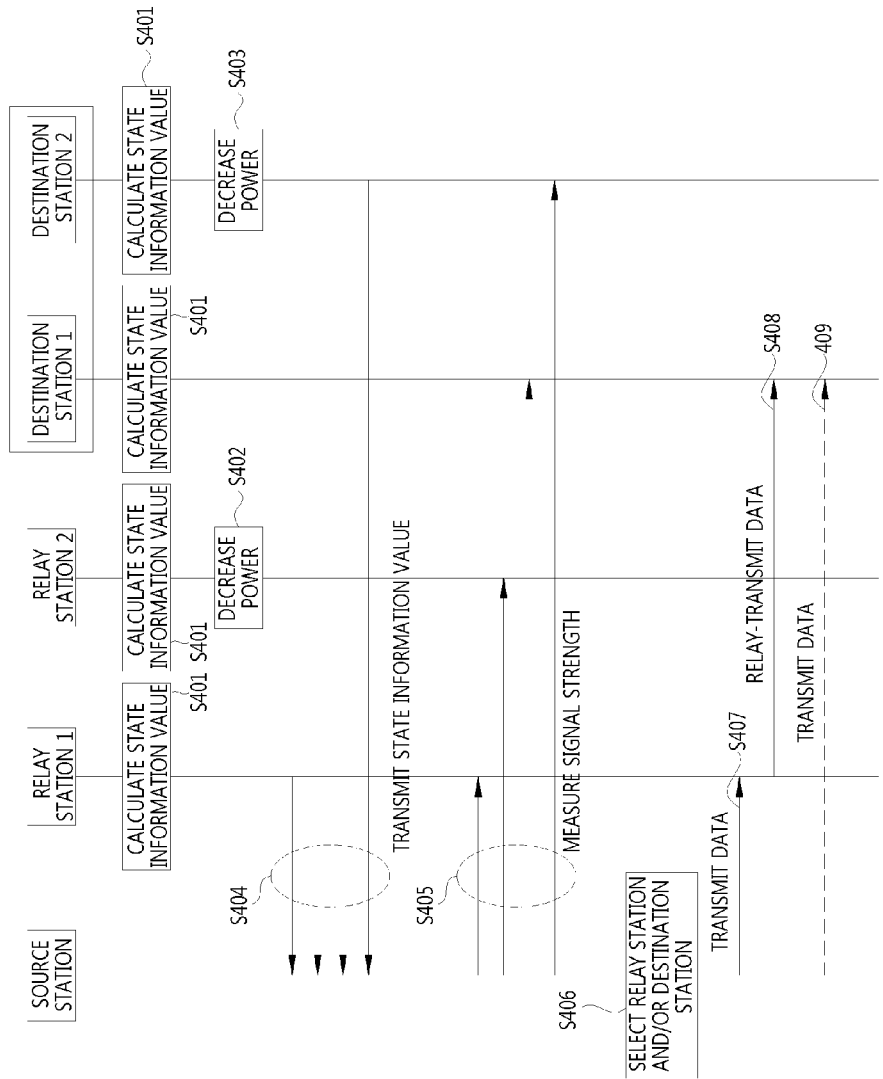
FIG. 4 is a flowchart showing a data transmission method according to another embodiment of the present invention.

FIG. 4 is a flowchart showing a data transmission method according to another embodiment of the present invention.

First, receiving stations (i.e., relay stations 1 and 2 and destination stations 1 and 2) calculate their corresponding state information values (step S401). Since a process of calculating the state information values has been described above with reference to FIG. 3, redundant descriptions will be omitted.

Once the state information values are calculated, each receiving station can regulate its transmission power according to its state information value. It is assumed in the present embodiment that the state information value is set to a great value as to a receiving station which is not suitable to be selected by a source station due to several reasons, such as a poor channel state, a large number of hops, a great offered load, etc.

Various methods may be used to determine whether the state information value is great or small. For example, a reference value of the state information value may be determined to compare a magnitude of the calculated state information value. Alternatively, the magnitude of the calculated state information value may be recognized by being compared with that of a state information value of another relay station or another destination station.

The state information value is calculated to a great value as to the relay station 2 and the destination station 2. The relay station 2 and the destination station state 2 decrease power accordingly (steps S402 and S403).

The receiving stations including the relay station 1, the relay station 2, the destination station 1, and the destination station 2 may transmit corresponding state information values to the source station (step S404). In this case, the state information values may be transmitted by using a broadcast channel or a system information message.

Thereafter, the source station measures signal strength of each receiving station to calculate a signal strength value (step S405). The source station receives a reference signal from each receiving station to measure strength of the reference signal, and thus can obtain the signal strength value.

In this case, according to the result of examining state information to calculate the state information value, signal strength values of the relay station 2 and the destination station 2 of which power is decreased in advance are measured to be less than those of other receiving stations. Since state information of each receiving station is included in advance in the signal strength values, the state information of each receiving station can be utilized even if cell selection and cell reselection are performed only using the signal strength values by each source station without having to additionally use a state information value. Then, when the source station selects a cell or determines whether to use a relay station or selects the relay station by considering only the signal strength value, a possibility of selecting the relay station 2 and the destination station 2 is decreased.

Alternatively, as in the example of FIG. 3, the source station may select a relay station and/or a destination station by using collected information such as the state information value and the signal strength value.

According to the result of selecting the receiving station by the source station (step S406), if it is determined that data is transmitted to the destination station 1 via the relay station 1, the source station transmits the data to the relay station 1 (step S407), and the relay station 1 relays the data to the destination station 1 (step S408).

Alternatively, according to the selection result, if it is determined that efficiency of radio resource usage is the highest when data is directly transmitted to the destination 1, the source station may directly transmit the data to the destination station (step S409).

The aforementioned embodiments of the present invention can be effectively applied in the following situations. It is assumed that one UE is located between a BS and a relay station, and is located closer to the relay station. In this case, the UE receives a strong signal from the relay station rather than from the BS. According to the conventional technique, if the load offered to the BS is similar to the load offered to the relay station, the UE establishes a connection to the relay station. When data of the UE is delivered to the relay station, the data is delivered again to the BS through a link between the relay station and the BS.

However, in this case, the distance between the relay station and the BS is farther than the distance between the UE and the BS. In addition, the farther the distance, the higher the probability of not having a good channel state. As a result, although it is effective to directly transmit data of the UE to the BS, the data is subjected to a process of being delivered by the relay station. In this process, many resources are unnecessarily consumed, thereby deteriorating efficiency of resource utilization.

On the contrary, according to the embodiments of the present invention, the UE may select the BS rather than the relay station. This is because, if the UE selects the receiving station on the basis of the station information value, the UE is able to not select a relay station having a poor channel state with the relay station. Alternatively, according to the embodiment described with reference to FIG. 4, a relay station which has recognized that a channel state with the BS is poor may decrease power to set weak signal strength to the UE so that the relay station is not selected.

If a channel state between the relay station and the BS is good and the number of hops is small and thus it is more effective than a case where the UE directly transmits data to the BS, the UE may select the relay station after considering a signal strength value and a state information value, and then attempt to access to the relay station.

According to embodiments of the present invention, data can be transmitted by using a suitable method on the basis of a radio condition or a channel state.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:
1. A data transmission method comprising:
receiving from a plurality of receiving stations, which include base stations and relay stations, a state information value corresponding to each receiving station;
measuring signal strength with respect to the receiving stations;
selecting any one receiving station among the receiving stations which have a high signal strength value obtained by measuring the signal strength and which have a small state information value; and
transmitting data to the selected receiving station,
wherein the state information value is received via a broadcast channel or a system information message,
wherein the state information value is expressed as a bitmap format,
wherein the state information value is determined based on a number of hops and an offered load of each of the receiving stations,
wherein the state information value is determined based on the number of hops accumulated during a time for delivering the data up to a base station, and the less the number of hops, the smaller the state information value,
wherein the state information value is set to be a high value when an offered load of the selected receiving station is high, and the offered load is high in a receiving station of which any one of an amount of the used radio resources, a number of connected user equipments, and an amount of buffered data is high,
wherein the selecting of the one receiving station comprises calculating a selection suitability for each receiving station by using the signal strength value and the state information value, and
selecting the receiving station having the highest selection suitability, and
wherein the selection suitability has a high value when the signal strength value is high and the state information value is small.
2. The data transmission method of claim 1, wherein, if the selected receiving station is a relay station, the state information value is determined based on a channel state of a link connected from the relay station to the base station, and the better the channel state, the smaller the state information value.

3. The data transmission method of claim 1, wherein, if the selected receiving station is a base station, the state information value of the receiving station is determined based on a channel state of a link connected with a user equipment, and the better the channel state, the smaller the state information value.

4. The data transmission method of claim 1, wherein, among the receiving stations, the state information value of a base station directly connected to a user equipment is set to the minimum state information value.

5. The data transmission method of claim 1, wherein, if the state information value of the receiving station is higher than a reference value, the receiving station decreases the transmission power.

6. The data transmission method of claim 1, wherein the selecting of the receiving station comprises:
selecting a set of the receiving stations of which the state information value is within a reference range; and
selecting the receiving station having the highest signal strength value among the set of the receiving stations.

7. A user equipment comprising:
a processor configured to execute instructions stored in a memory, the processor further configured to:
receive from a plurality of receiving stations, which include base stations and relay stations, a state information value corresponding to each receiving station;
measure signal strength with respect to the receiving stations;
select any one receiving station among the receiving stations which have a high signal strength value obtained by measuring the signal strength and which have a small state information value; and
transmit data to the selected receiving station,
wherein the state information value is received via a broadcast channel or a system information message,
wherein the state information value is expressed as a bitmap format,
wherein the state information value is determined based on a number of hops and an offered load of each of the receiving stations,
wherein the state information value is determined based on the number of hops accumulated during a time for delivering the data up to a base station, and the less the number of hops, the smaller the state information value,
wherein the state information value is set to be a high value when an offered load of the selected receiving station is high, and the offered load is high in a receiving station of which any one of an amount of the used radio resources, a number of connected user equipments, and an amount of buffered data is high,
wherein the one receiving station is selected by calculating a selection suitability for each receiving station by using the signal strength value and the state information value, and selecting the receiving station having the highest selection suitability, and
wherein the selection suitability has a high value when the signal strength value is high and the state information value is small.

8. The user equipment of claim 7, wherein, if the selected receiving station is a relay station, the state information value is determined based on a channel state of a link connected from the relay station to the base station, and the better the channel state, the smaller the state information value.

9. The user equipment of claim 7, wherein, if the selected receiving station is a base station, the state information value of the receiving station is determined based on a channel state of a link connected with a user equipment, and the better the channel state, the smaller the state information value.

10. The user equipment of claim 7, wherein, among the receiving stations, the state information value of a base station directly connected to a user equipment is set to the minimum state information value.

11. The user equipment of claim 7, wherein, if the state information value of the receiving station is higher than a reference value, the receiving station decreases the transmission power.

12. The user equipment of claim 7 wherein the processor selects the one receiving station by selecting a set of the receiving stations of which the state information value is within a reference range, and selecting the receiving station having the highest signal strength value among the set of the receiving stations.

* * * * *